UNITED STATES PATENT OFFICE.

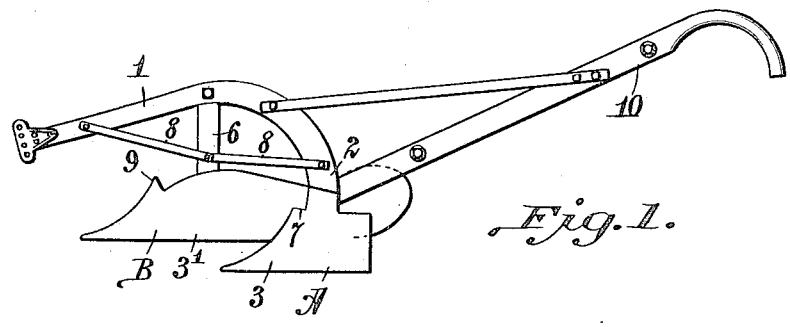
Fig. 1.
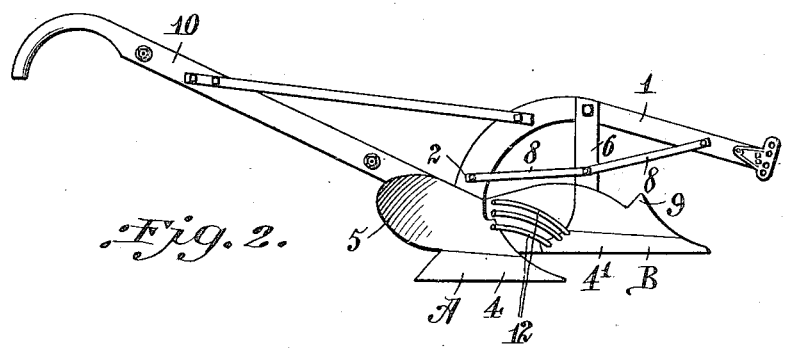
Fig. 2.
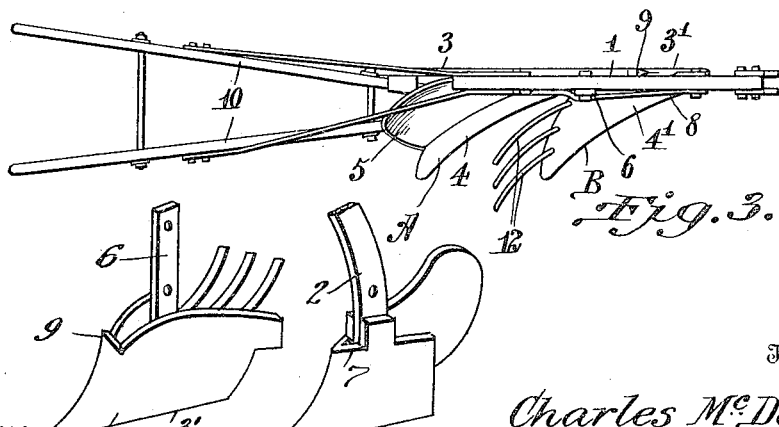
Fig. 3.
Fig. 4.

CHARLES McDOWELL, OF STURGIS, SOUTH DAKOTA.

PLOW.

1,137,646.

Specification of Letters Patent.

Patented Apr. 27, 1915.

Application filed November 29, 1911. Serial No. 662,958.

*To all whom it may concern:*

Be it known that I, CHARLES McDOWELL, a citizen of the United States, residing at Sturgis, in the county of Meade and State of South Dakota, have invented new and useful Improvements in Plows, of which the following is a specification.

This invention relates to plows and especially to breaking plows of that type in which two plows are supported upon and carried by a single beam, one above and in advance of the other, the first plow being adapted to turn a relatively thin slice which is subsequently covered by the slice turned by the second plow.

The invention has for its object to produce a plow of the character described which shall be simple in construction and efficient in operation, and with these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing, Figure 1 is a side elevation of a plow constructed in accordance with the invention as seen from the land side. Fig. 2 is a side elevation of the same as seen from the furrow side. Fig. 3 is a top plan view. Fig. 4 is a perspective detail view of parts of the front and rear plow units.

Corresponding parts in the several figures are denoted by like characters of reference.

The plow beam 1, which may be of any suitable and conventional construction, has been shown as consisting of an iron or steel beam which is bent to form a standard 2 upon which the plow unit A is mounted; the landside 3 of said plow unit being suitably bolted or otherwise secured upon the standard 2. The mold board 4 of the plow unit A is bolted or otherwise secured in position, said mold board, as well as the share 5, being reinforced and strengthened in the usual manner by means of braces which, however, do not appear.

The beam 1 is equipped in front of the standard 2 with an auxiliary standard 6 which may be attached to the beam 1 in any suitable manner. The standard 6 carries the plow unit B which may be of a construction generally resembling that of the unit A. The landside 3' of the unit B is, however, extended rearwardly and is accommodated in a notch 7 formed at the front upper corner of the landside 3 of the plow unit A where the said rearward extension of the landside 3' will be securely supported. Said landside 3' is also provided with an upwardly extending tooth or cutting member 9 having a sharp front edge that will serve to cut the sod in advance of the plow. The mold board 4' of the plow unit B is also provided with a plurality of rearwardly extending fingers 12 serving to guide the furrow slice that is being turned by said plow unit and to assist in breaking and pulverizing the same. Braces 8 serve to connect the standard 6 with the front end of the plow beam 1 and with the standard 2, thereby strengthening and reinforcing the auxiliary standard 6. It will be observed that the landsides of the two plow units are mounted in the same plane and that the plow unit B is supported at a suitable elevation above the plow unit A. It follows that when the plow is in operation, the top slice of sod will be turned by the plow unit B, after which the plow unit A following in the furrow made by the unit B will overturn a slice of soil which will be deposited upon the slice already overturned. After the first round is made by the plow the sod slice turned by the plow unit B will be deposited in the bottom of the furrow first made and will be covered by the slice turned by the plow unit A.

The plow may be provided with handles 10, whereby it may be guided, and means may be provided at the front end of the beam for the attachment of draft animals. The handles, however, may be omitted, and the improved plow may be mounted in a sulky frame, or it may be utilized in a gang plow operated by animal power or by a tractor of any description.

With the improved plow a deeper furrow may be made than with an ordinary plow at the same expenditure of power. The disk colter ordinarily employed may be dispensed with, the sod being cut by the tooth 9 formed upon the landside of the leading plow unit B. Land that is plowed with the improved breaking plow will be thoroughly and efficiently broken and pulverized and will be in fine shape for seeding when harrowed. It also makes a fine seed bed for corn that can be cultivated to conserve moisture while land plowed with the ordinary breaking plow cannot be so cultivated. The improved plow is especially adapted to the prairie country, insuring better crops in the first seeding. The construction is simple and inexpensive, and the device will be found thoroughly efficient for the purposes for which it is provided.

Having thus described the invention, what it claimed as new, is:—

In a breaking plow, a beam, two standards associated therewith, plow units carried by the two standards, the landsides of said units being disposed in the same plane, and one unit being disposed above and in advance of the other unit, the landside of the lower rear unit being provided with a notch at its upper front corner, and the landside of the upper front unit being extended rearwardly and seated in said notch.

In testimony whereof I affix my signature in presence of two witnesses.

CHARLES McDOWELL.

Witnesses:
D. DWIGHT EVANS,
EDMUND H. SWEET.

Copies of this patent may be obtained for five cents each, by addressing the "Commissioner of Patents, Washington, D. C."